Patented Dec. 12, 1944

2,365,033

UNITED STATES PATENT OFFICE 2,365,033

GRAVEL PACKING OF WELLS

Milton Williams, Houston, Tex., assignor to Standard Oil Development Company, a corporation of Delaware No Drawing. Application May 2, 1942,
Serial No. 441,441

8 Claims. (Cl. 166—26)

The present invention is directed to a method of gravel packing wells and to a novel gravel pack.

In the production of fluids from underground reservoirs it is often desirable to interpose a filtering medium or pack between the producing formation and the tubing or conduit employed to conduct the fluid to the surface of the earth. For example, if the producing formation is an unconsolidated sand the particles may be carried into the borehole along with the fluid and fill up the interstices of a screen or like filtering medium and greatly reduce, if not entirely prevent, production from the formation.

Efforts have been made to prevent the influx of sand into the borehole by the placement of selected sizes of gravel or sand adjacent the bore of the well to act as a filter pack. Wells provided with these artificially produced filters have been found more satisfactory than those in which they are absent, but difficulty has been encountered in preventing the movement of the particles comprising the filter pack.

The present invention is directed to a method of forming a gravel or filter pack in a borehole and consolidation of the pack to eliminate undesirable movement of particles comprising the pack.

More specifically, the present invention is directed to the employment in a filter pack of granular materials having slowly soluble surfaces which will swell upon exposure to a selected liquid and which, after swelling, may be treated to gelatinize or harden the swollen surfaces, thereby consolidating the pack.

The step of placing granular materials in boreholes to form a filter pack is now conventional to the art. Various arrangements are available for placing the granular material in the desired position in the borehole. Any of these conventional techniques may be employed in the step of placing the granular material employed.

The present invention may be generally described as including the steps of placing granular material provided with difficultly soluble surfaces in position in a borehole, contacting the particles with a liquid which causes the softening and swelling of the surfaces, and subsequently injecting a solution into the borehole capable of reacting with the coating to form an insoluble compound. This technique will effect a bonding of the several particles composing the pack, thereby preventing undesirable movement of the individual particles of the pack.

Slowly soluble sodium silicate compounds have been found particularly suitable for use as the coating of the granular material employed in forming the filter pack of the present invention. Particles of the sodium silicate compound in suitable sizes may be used for this purpose or, in alternative, gravel particles coated with the silicate solution may be employed. In either case the particles are placed in the borehole adjacent the producing formation and allowed to remain in contact with water until the silicate surfaces soften and swell. This swelling insures that the surfaces of the several particles will make good contact with each other while, at the same time, passages will remain between the several particles to allow the flow of fluids therethrough. After this swelling step, suitable solutions, such as calcium, aluminum, or magnesium salts, or acids such as hydrochloric, nitric, or sulfuric may be forced in the borehole into contact with the particles and retained for such a period of time as is necessary to gelatinize or harden the silicate material, thereby producing a consolidated mass.

It has been found that a sodium silicate of moderately high $SiO_2$ $Na_2O$ ratio gives very satisfactory results. The particles may be lumps of the sodium silicate material, or may be gravel which has been coated with the sodium silicate. One method of coating the gravel is by dipping the particles into a bath of molten sodium silicate and then solidifying the coating by cooling. Another method of coating the granules is by dipping them in a solution of sodium silicate to form a coating, and drying the coating by dipping the granules into a bath of absolute alcohol or similar drying liquid. The ratio of $SiO_2$ to $Na_2O$ will, of course, be varied to produce a material which will soften and swell in no less time than required to place the gravel in position and conduct a suitable hardening agent into the well in contact therewith. It may be stated generally that the ratio should be no less than two parts of $SiO_2$ to one part of $Na_2O$, but, as well known to the art, the properties of the sodium silicates may be varied over a considerable range by varying the proportions of the silicate and the sodium oxide, and the composition required for the particular circumstances will be selected with due regard to the time required for placing the gravel and the treating agents in position.

Having fully described the present invention and the method of practicing it, what I desire to claim is:

1. A filter pack comprising a plurality of granular particles having gelatinous silicate surfaces in mutual contact to form a consolidated mass.

2. A method of treating a well, comprising the steps of forming a filter pack in the well bore adjacent the producing formation of granular material having slowly soluble silicate surfaces, contacting said particles with water to soften and swell said surfaces, and subsequently replacing said water with a silicate hardening material whereby said pack is consolidated.

3. A method in accordance with claim 2 in which particles of sodium silicate are employed as a granular material.

4. A method in accordance with claim 2 in which substantially insoluble particles of rock coated with a difficultly soluble silicate compound are employed as the granular material.

5. A method in accordance with claim 2 in which the gelatinizing or hardening material is an acid.

6. A method in accordance with claim 2 in which the gelatinizing or hardening agent comprises a solution having an ion capable of reacting with the surfaces of the granular particles to produce an insoluble silicate.

7. A method of producing a filter pack comprising the steps of forming a filter pack of granular particles each provided with an outside surface layer capable of softening and swelling upon contact with a first treating agent and capable of hardening upon contact with a second treating agent, maintaining said pack in contact with first treating agent for a sufficient interval of time to allow it to soften and swell said surfaces, and subsequently maintaining said pack in contact with second treating agent for a sufficient interval of time to allow it to harden said swelled surfaces, whereby a consolidated pack is produced.

8. A method of producing a filter pack, comprising the steps of forming a filter pack of granular particles provided with outside surfaces of a slowly soluble silicate compound, placing said pack in contact with a swelling agent for a sufficient interval of time to allow the formation of films connecting said particles, and subsequently maintaining said pack in contact with a liquid capable of hardening the silicate material for a sufficient interval of time to harden said silicate material.

MILTON WILLIAMS.